2 Sheets--Sheet 1.

T. ROBERTSON.
Machines for Shaping Lozenges.

No. 153,018. Patented July 14, 1874.

Witnesses: Inventor:

2 Sheets--Sheet 2.
T. ROBERTSON.
Machines for Shaping Lozenges.
No. 153,018. Patented July 14, 1874.
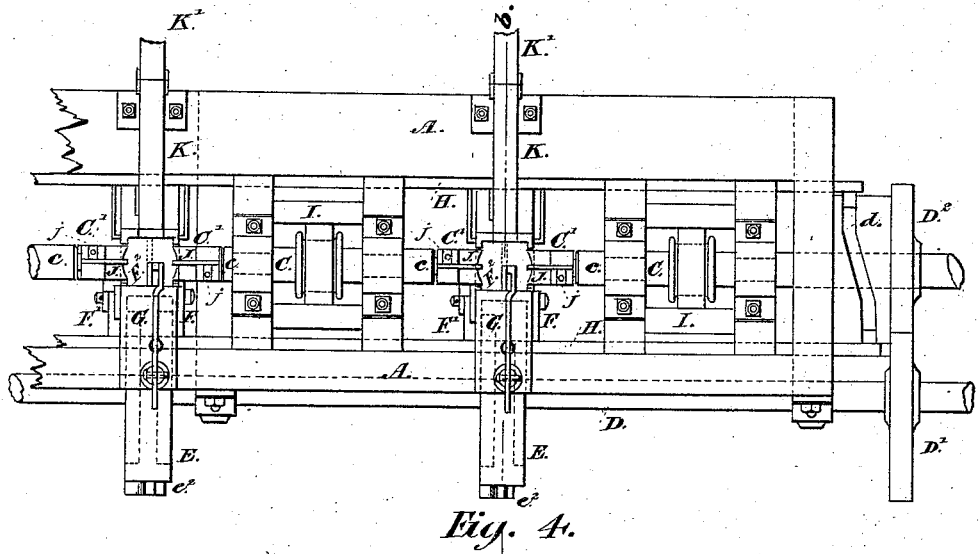
Fig. 4.
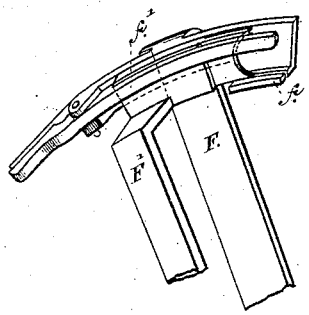
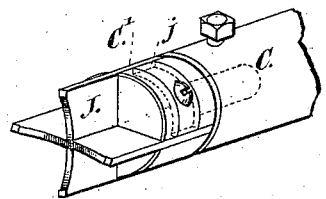
Fig. 5. Fig. 6.
Witnesses: Inventor
Geo. A. Aird Thomas Robertson
Hugh Aird per D. B. Ridout & Boy
Atty's
THE GRAPHIC CO. PHOTO-LITH. 39 & 41 PARK PLACE, N.Y.

UNITED STATES PATENT OFFICE.

THOMAS ROBERTSON, OF TORONTO, CANADA.

IMPROVEMENT IN MACHINES FOR SHAPING LOZENGES.

Specification forming part of Letters Patent No. 153,018, dated July 14, 1874; application filed March 16, 1874.

*To all whom it may concern:*

Be it known that I, THOMAS ROBERTSON, of the city of Toronto, in the county of York and in the Province of Ontario, Canada, have invented a Process and Machine for Shaping Lozenges, of which the following is a specification:

My invention relates to the manufacture of that class of confectionery known as lozenges; and it consists principally in subjecting the corners and flat sides of lozenges, after they are cut or hardened sufficiently in the ordinary way, to the action of revolving cutters, of suitable shape, the object being to reduce a flat-sided lozenge to one having an oval, a chamfered, or a molded face.

One great objection to the ordinary lozenge of commerce is, that when taken into the mouth its sharp edges are felt uncomfortable, and generally the first thing a person does when eating one is to snap it in two pieces, and after sucking it a short time break the pieces up and swallow them before they dissolve in the mouth. By giving the faces of the lozenges an oval or rounding shape, or even by chamfering the sharp edges, the lozenges fit the mouth much better, and there is no desire on the part of the person eating them to break them, the lozenge being gradually and satisfactorily reduced by the action of the saliva and swallowed in solution.

The great objection to comfits prepared in the pan by the accumulation of sirup around a nucleus is not only that the majority of the comfit is composed of sirup and the flavoring of the nucleus lost, but the whole labor of manufacture is necessary by skillful hands, for the reason that the germs of the comfit are very apt to stick to each other, great care being necessary to keep them separate and cause the comfits to grow uniformly and regularly of a desired shape.

With my machine the lozenge-nucleus or comfit-germ can be so shaped before it is put in the pan that only a thin coating of the sirup is required to give it the finish and market value of the comfit prepared in the old way, with the additional advantages of superior flavor and less cost to the manufacturer.

Figures 1, 2:
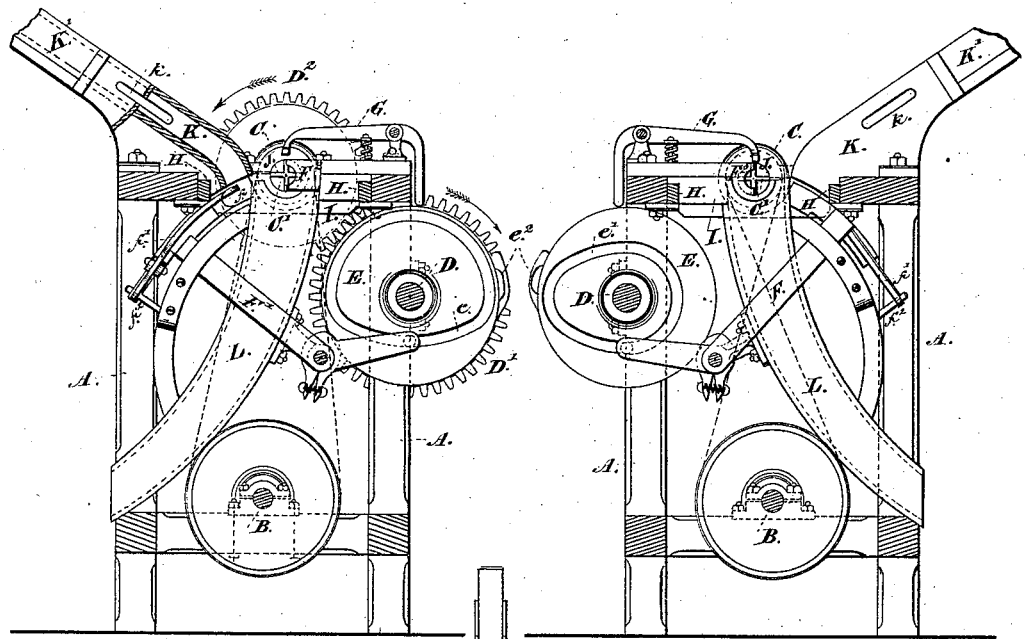
Figure 3:
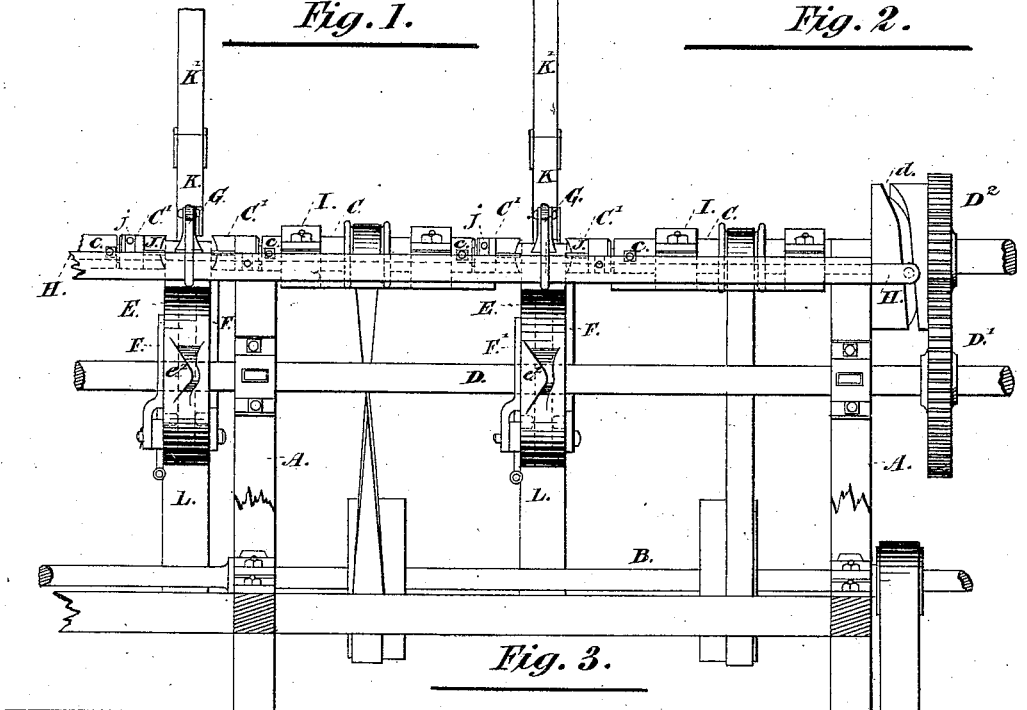

In the accompanying drawings, Figures 1 and 2 are cross-sections of my lozenge-shaping machine on the line $a\ b$. Fig. 3 is a longitudinal section; Fig. 4 plan of my machine. Fig. 5 is a detail of the apparatus for feeding the lozenges to the revolving cutters and holding them while they are being operated upon by the cutters. Fig. 6 is a detail of the revolving cutters.

A is the frame of the machine, which, in the drawings, is shown in wood, but which may be of iron or other suitable material. B is the shaft from which the cutter-shafts C C are driven in opposite directions by belt, as shown, and which is connected by belt or gearing, with the running-shaft of shop. D is the shaft, driven in any suitable way, on which are fastened the cam-wheels E, which operate and regulate the feed of lozenges to the revolving cutters C' by means of the levers F and $F^1$ working from the eccentric channels $e$ $e^1$ sunk in the sides of E. On the periphery of E is a raised cam-guide, $e^2$, which, when the wheel E revolves, actuates the hinge-lever G, causing it, by the peculiar motion communicated to it, to free the lozenges from the jaws which hold them, while the revolving cutters act on their sides. On D is also fastened the geared wheel $D^1$ driving the wheel $D^2$, which has cut in the periphery of its hub the inflected channel $d$, into which fit, on opposite sides, one end of the sliding rods H. The action of the channel $d$ when the wheel $D^2$ revolves gives to the rods H A a sliding horizontal motion backward and forward, the distance traveled being regulated by the inflection of the channel $d$. To these rods are attached alternately, in any convenient way, the sliding frames I, to which are fastened and running in suitable bearings the revolving cutter-shafts C C. The channel $d$ is cut in such a way that the inflection, on opposite sides of the hub, although exactly equal from a center, diverges in precisely an opposite direction; the object of this is to cause the revolving cutters $C^1$, fastened to the shaft C C, to approach and recede from each other during each revolution of the wheel $D^2$. The cutter-heads fit into the sockets $c\ c$ on the shaft C C. In the detail of these cutter-heads, shown in Fig. 6, it will be seen that the knives J are detachable, being held in their place by the clamps $j$. This is done for the purpose of using knives of different shapes in the same cutter-heads, and that the knives may be easily detached when broken or in want of sharpening. The cutter-heads C' containing the knives can also be so adjusted that by moving and clamping them in the sockets c c they will reduce lozenges to different thicknesses.

The feed-levers F F¹, shown in detail in Fig. 5, receive the single lozenge as it drops from the feed-tube K, F having a lower lip, $f$, on which the lozenge stands, the rear edge of the lozenge fitting into the concave feather end of the lever F¹, and being held upright by the spring-guards $f^1$, which close upon the lozenge, and press it tightly against the side of F as the levers are impelled forward between the revolving cutters C'. A pin, $f^2$, engages the end of the spring-guard $f^1$, causing it to spread, and when the said guard $f^1$ is moved forward, the pin being removed from contact with it, it springs in, closing upon the lozenge. On the frame of the machine, immediately in the center between the cutters C', and exactly opposite to the feather end of F¹, is placed a semicircular lozenge-holder, F², in shape and thickness similar to the end of the lever F¹. The lozenge is caught on edge, as the machine revolves, by the end of the lever F¹, and is received by and pressed tightly against the holder F². The action of the eccentric channels $e$ sunk in E now removes the lever F, which is carried back to its original position, leaving the lozenge clear and ready for the action of the revolving cutters, which come forward at once and act upon its edges and sides, as desired, reducing it to the required shape and thickness. The remaining lever F¹ now quickly retires, allowing the lozenge to drop into the tube L, which carries it off. The lever F² is provided with jaws at the point upon which it hinges, between which is placed a spring, for the purpose of regulating the pressure on the edges of the lozenge. To prevent the lozenge sticking in the holder F² or the end of F¹, the lever G is placed on the machine and actuated, as before described, and removes the lozenge with certainty the moment the lever F¹ and cutter begin to recede from the center.

It will be seen from an inspection of the sections that during the time the above operation has been going on the mouth of the feed-tube K is closed by the lever F¹, allowing but one lozenge at a time to be carried forward. The lower part of the feed-tube K is fastened to the machine at an angle, and curved downward at the mouth, as shown, and the passage cut within it is of such a shape that the lozenges stand on edge, and roll down an inclined plane to the mouth. To the upper part of the feed-tube are fitted detachable tubes K', which have a similar passage cut within, and which are filled with lozenges from a table, the object being to have a continuous feed by replacing a tube when empty with a full one before all the lozenges have passed out of the feed-tube K, the hole $k$ being cut in the side for inspection.

I do not confine myself to one set of revolving cutters, as many sets could be worked in one machine, and from the line-shafting, as desired, each being a repetition of the last.

The advantages of my invention are that lozenges can be reduced and shaped to any size or form required after they are cut and hardened sufficiently in the usual way. The novel appearance and finish of goods made in this way must be a great advantage to the manufacture.

I claim as my invention—

1. The process herein substantially described of shaping the faces of lozenges by the action of the revolving cutters C', as and for the purpose specified.

2. The combination of the two oppositely-revolving and horizontally-reciprocating cutter-shafts C C, having the cutter-heads C', with the lozenge-holder F² and lever F¹, substantially as and for the purposes set forth.

3. The revolving shaft D and wheels E, with eccentric channels $e$ and $e^1$, in combination with the levers F F¹, arranged and operating substantially as described.

4. The revolving shaft D and wheel E, with cam $e^2$, in combination with the lever G, arranged and operating substantially as described.

5. The revolving shaft D and wheel D¹, and wheel D² on its shaft, having the inflected channel $d$ cut in its hub, in combination with the horizontally-sliding rods H and frames I, the said rods and frames having imparted to them, by the rotation of said wheel D², a direct reciprocating movement, substantially as and for the purposes specified.

6. The levers F and F¹, with spring-guard $f$, in combination with the lozenge-holder F², arranged and operating substantially as and for the purpose specified.

7. The levers F F¹, with the spring-guard $f$, in combination with the feed-tube K, arranged substantially as and for the purpose specified.

8. The combination of the feed-tubes K with the detachable tubes K', substantially as herein shown and described.

9. The lever F¹ and holder F², in combination with the revolving cutters C', arranged and operating substantially as described, and for the purpose specified.

10. The spring-guard $f$, in combination with the pin $f^2$, arranged substantially as and for the purpose set forth.

THOMAS ROBERTSON.

Witnesses:
GEO. A. AIRD,
HUGH AIRD.